(12) United States Patent
Suzuki et al.

(10) Patent No.: US 7,889,170 B2
(45) Date of Patent: Feb. 15, 2011

(54) INNER FORCE SENSE PRESENTATION DEVICE, INNER FORCE SENSE PRESENTATION METHOD, AND INNER FORCE SENSE PRESENTATION PROGRAM

(75) Inventors: Yuriko Suzuki, Yokohama (JP); Minoru Kobayashi, Kokubunji (JP); Katsuhiko Ogawa, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 704 days.

(21) Appl. No.: 10/579,469

(22) PCT Filed: Jul. 14, 2005

(86) PCT No.: PCT/JP2005/013089

§ 371 (c)(1),
(2), (4) Date: May 15, 2006

(87) PCT Pub. No.: WO2006/006686

PCT Pub. Date: Jan. 19, 2006

(65) Prior Publication Data

US 2007/0085820 A1    Apr. 19, 2007

(30) Foreign Application Priority Data

Jul. 15, 2004  (JP) .............................. 2004-208624
Aug. 5, 2004   (JP) .............................. 2004-228787

(51) Int. Cl.
*G09G 5/00*   (2006.01)
*G10H 1/18*   (2006.01)
*G10H 3/14*   (2006.01)
*H03M 11/00*  (2006.01)

(52) U.S. Cl. .......................... 345/156; 84/615; 84/725; 341/27

(58) Field of Classification Search ................ 345/156, 345/161, 168
See application file for complete search history.

(56) References Cited

U.S. PATENT DOCUMENTS 5,017,770 A * 5/1991 Sigalov ...................... 250/221

(Continued)

FOREIGN PATENT DOCUMENTS

JP    6-301475    10/1994

(Continued)

OTHER PUBLICATIONS

Suzuki, Yuriko et al., "Design of Air Pressure Based Force Display toward Untethered Human Interface", Transactions of Information Processing Society of Japan, vol. 43, No. 12, pp. 3643-3652, 2002.

(Continued)

*Primary Examiner*—Bipin Shalwala
*Assistant Examiner*—Benyam Ketema
(74) *Attorney, Agent, or Firm*—Oblon, Spivak, McClelland, Maier & Neustadt, L.L.P.

(57) ABSTRACT

A force feedback apparatus of the present invention includes: jetting means that includes a nozzle and that can control a jet amount or a jet direction of gas or liquid jetted from the nozzle; jet control means for controlling the jet amount or the jet direction of the gas or the liquid according to a position or an orientation of a receiver that receives pressure by the gas or the liquid jetted from the jetting means so as to provide force feedback to an operator. When the receiver has a concave shape of a diameter D, intervals for placing the nozzles in the jetting means are set such that at least one nozzle exists within a region having a diameter of a constant×D.

9 Claims, 17 Drawing Sheets

U.S. PATENT DOCUMENTS

| | | | | |
|---|---|---|---|---|
| 6,757,068 | B2 * | 6/2004 | Foxlin | 356/620 |
| 7,352,356 | B2 * | 4/2008 | Roberts et al. | 345/156 |

FOREIGN PATENT DOCUMENTS

| | | | |
|---|---|---|---|
| JP | 2001 22499 | | 1/2001 |
| JP | 2001-022499 | * | 1/2001 |
| JP | 2001022499 | * | 1/2001 |
| JP | 2002-297310 | | 10/2002 |
| JP | 2003 256105 | | 9/2003 |
| JP | 2004-94307 | | 3/2004 |
| JP | 2004 157677 | | 6/2004 |
| JP | 2004157677 | * | 6/2004 |

OTHER PUBLICATIONS

Shimojo, Makoto et al., "Shape Recognition Performance Depending on Pin-Matrix Density for 3D Tactile Display", Transactions of Information Processing Society of Japan D-II, vol. J80-D-II, No. 5, pp. 1202-1208, 1997.

Suzuki, Yuriko et al.,"An Untethered Haptic Display by Arrayed Air-jets", Technical Report of IEICE, vol. 103, No. 205, pp. 71-76, 2003. (With English Abstract).

Suazuki, Yuriko," Untethered Force Feedback Interface That Uses Air Jets", SIGGRAPH2004 website, Jun. 2004, http://www.siggraph.org/s2004/conference/etech/untethered.php?=conference, pp. 1-2, 2004.

Orth, Maggie,"Interface to Architecture: Integrating Technology Into the Environment in the Brain Opera", Proceedings of the Conference on Designing Interactive Systems: Processes, Practices, Methods, and Techniques, pp. 265-275, 1997.

European Search Report dated Dec. 10, 2010 in European Patent Application No. 05760134.6-2212, 6 pages.

Yuriko Suzuki, et al., "Untethered Force Feedback Interface That Uses Air Jets", Jul. 31, 2003, Nippon Telegraph and Telephone, XP002611501, the whole document.

* cited by examiner

INNER FORCE SENSE PRESENTATION DEVICE, INNER FORCE SENSE PRESENTATION METHOD, AND INNER FORCE SENSE PRESENTATION PROGRAM

TECHNICAL FIELD

The present invention relates to a force feedback technique for providing a force to a receiver that is held by an operator over a jet of air and the like so as to provide force feedback to the operator.

In addition, the present invention relates to a force feedback technique for comparing a virtual object to a musical instrument so that the operator can perform with sense of operation by using a virtual reality technique and the force feedback technique.

BACKGROUND ART

A force feedback apparatus for providing force feedback to an operator using the pressure of a gas jet is proposed (refer to Patent documents 1-3, and Non-patent documents 1 and 2, for example). According to this force feedback apparatus, by combining operation of the operator with virtual reality, in addition to changing, deforming or moving the virtual object displayed in the virtual environment, it becomes also possible to provide force feedback to the operator in synchronization with movement of the virtual object.

[Patent document 1] Japanese Laid-Open Patent Application No. 2001-22499

[Patent document 2] Japanese Laid-Open Patent Application No. 2003-256105

[Patent document 3] Japanese Laid-Open Patent Application No. 2004-157677

[Non-patent document 1] Yuriko Suzuki, "Untethered Force Feedback Interface That Uses Air Jets", MVE of IEICE, pp. 71-76, July 2003

[Non-patent document 2] Yuriko Suzuki, "Untethered Force Feedback Interface That Uses Air Jets", SIGGRAPH2004 website, 2004-06, http://www.siggraph.org/ s2004/conference/etech/ untethered.php?=conference (searched on 9 Jul. 2004)

[Non-patent document 3] Maggie Orth, "Interface to architecture: integrating technology into the environment in the Brain Opera", Proceedings of the conference on Designing interactive systems: processes, practices, methods, and techniques, Symposium on Designing Interactive Systems, Amsterdam, the Netherlands, Pages: 266-275, 1997 (ISMN: 0-89719-836-0) ACM Press New York, N.Y., USA

DISCLOSURE OF THE INVENTION

Problem to be Solved by the Invention

In the above-mentioned force feedback apparatus, the degree of fed-back force can be changed by moving the receiver over a plane on which nozzles are arranged, and controlling jets from the nozzles existing directly below the receiver or in the periphery of the position directly below according to the position of the receiver.

However, for example, when intervals at which the nozzles are placed are too wide, there is a case in which the pressure received by the receiver, namely, force feedback is not enough. From this viewpoint, it is required to determine proper nozzle placement intervals so as to stably provide force feedback to the operator having the receiver.

By the way, generally, to play a musical instrument, it is necessary to express and operate differences of attributes of sound (tone quality, scale, loudness, intensity, sound pitch, generating timing, generating term, number of generating times, and the like). Many general musical instruments have a physical structure for generating sounds so that sounds can be generated by operations corresponding to the physical structure. Therefore, the physical structure and the operations for generating sounds are integrated. By using a computer, operations for generating sounds can be freely assigned. For example, the hyper instrument (electric musical instrument using digital technology and sensor technology) devised by Professor Tod Machover in MIT (Massachusetts Institute of Technology) Media Laboratory is famous. By using this electronic musical instrument, music can be performed by gestures (refer to non-patent document 3, for example). According to this technology, musical instruments having a free structure can be created, and this technology is effective in terms of new art forms or in terms of learning by children.

However, as to the above-mentioned musical instrument using the computer, although operations of sounds can be freely assigned, it is necessary to make the musical instrument on an individual basis so that the design of the musical instrument cannot be easily changed. In addition, there is not interactive flexibility such as changing the shape, position, movement or the like of the musical instrument while playing it.

On the other hand, in the virtual reality technique using images or sounds in which movement of the operator is reflected in computer graphics, a shape can be freely made or the shape can be changed interactively, so that the shape of the musical instrument can be freely changed by using this technique. Therefore, there is flexibility for sound operations.

When using such a method, a sense of operating the sounds can be presented visually and auditorily. However, presentation of a force sense using physical feedback cannot be realized. In addition, since a sense of controlling sounds using a force of a human does not exist, the operation is difficult.

As a technology for applying force feedback to a virtual object in virtual reality, there is a method for operating a wire or an arm, or a method for attaching an apparatus to a human body. However, since these are connected to a holding apparatus, hands cannot be moved freely. Thus, these techniques are not suitable for free movement of hands that is necessary for performance. In addition, it is difficult to safely receive feedback from an object having dynamic movement for representing the interactively changing object.

The present invention is contrived in terms of the above-mentioned points, and an object of the present invention is to provide a technique to stably provide force feedback to an operator having a receiver in a force feedback apparatus having one or more nozzles.

Another object of the present invention is to provide a technique for comparing a freely created virtual object to a musical instrument so as to enable an operator to play the musical instrument with force feedback.

Means for Solving the Problem

The above object is achieved by a force feedback apparatus including:

jetting means that includes a nozzle and that can control a jet amount or a jet direction of gas or liquid jetted from the nozzle;

jet control means for controlling the jet amount or the jet direction of the gas or the liquid according to a position or an orientation of a receiver that receives pressure by the gas or the liquid jetted from the jetting means so as to provide force feedback to an operator, wherein the position or the orientation of the receiver is measured by receiver measurement means;

wherein, when the receiver has a concave shape of a diameter D, intervals for placing the nozzles in the jetting means are set such that at least one nozzle exists within a region having a diameter of a constant×D. When the receiver has a hemispheric shape, the constant is 0.8.

The present invention can be also configured as a force feedback apparatus including:

jetting means that includes a nozzle and that can control a jet amount or a jet direction of gas or liquid jetted from the nozzle;

jet control means for controlling the jet amount or the jet direction of the gas or the liquid according to a position or an orientation of a receiver that receives pressure by the gas or the liquid jetted from the jetting means so as to provide force feedback to an operator, wherein the position or the orientation of the receiver is measured by receiver measurement means;

wherein the nozzle includes nozzle open/close means for opening or closing in response to occurrence of a jet of the gas or the liquid, and wherein a point of support for opening and closing of the nozzle open/close means is provided in the side of an operator.

The force feedback apparatus may further include virtual object calculation means for calculating a state of a virtual object in a virtual environment, to be displayed by virtual environment display means, according to the position or the orientation of the receiver. In addition, the force feedback apparatus may further include sound generation control means for controlling an attribute of a sound, to be generated by sound generation means, according to the state of the virtual object, or the position or the orientation of the receiver.

Effect of the Invention

According to the present invention, since the placement intervals of the nozzles are set such that at least one nozzle exists within a region of a diameter of a constant×D for a concave receiver having a diameter D, the receiver can receive a jet from the nozzle with sufficient pressure so that force feedback can be provided stably.

In addition, according to the present invention, the jet amount or the jet direction of the air and the like is controlled according to the state of the virtual object, or the position or the orientation of the receiver, the attribute of the sound to be generated by the sound generation means is controlled, and the virtual object is calculated according to the position or the direction of the receiver that receives the pressure of the air and the like. Therefore, a musical instrument can be defined by the virtual object and the operator can use the receiver as a control bar for performance, so that performance using the virtual object can be realized according to the position or the orientation of the receiver. In this case, the receiver can provide physical feedback of force.

In addition, by providing force feedback using the jet air and the like, operational feeling the same as that for playing a conventional musical instrument that controls sounds using force (hardly beating, touching weakly, and the like) can be experienced. In this case, it is not necessary for the operator to wear an apparatus for providing force, and it is not necessary to have or attach an arm or a wire connected to a holding apparatus. Therefore, movement of the operator is not hindered. Accordingly, the operator can be physically untethered, and can perform by freely moving the body such as hands.

In addition, since air and the like is used for force feedback, force feedback can be provided safely without placing an excessive workload on the user even though the user moves the receiver rapidly for representing movements of objects that dynamically move for representing interactively changing virtual objects. In addition, by using air, since it is transparent, it does not hinder image displaying.

In addition, since the nozzle open/close means is provided at the nozzle, the nozzle can be prevented from entering into the virtual environment image by closing the nozzle that is not jetting air when the virtual environment image is projected on the region of the jetting means or the virtual environment image is viewed through the head mounted display. In addition, by providing the point of support of opening/closing the nozzle open/close means in the side of the operator, the nozzle can hardly be seen by the operator.

| Description of reference signs | |
|---|---|
| 1: | receiver |
| 2: | receiver measurement unit |
| 3: | virtual object calculation unit |
| 4: | virtual space display unit |
| 5: | jet control unit |
| 6: | jetting unit, 601: jet air, 602: nozzle |
| 7: | sound generation control unit |
| 8: | sound generation unit |
| 9: | operator |
| 10: | nozzle open/close unit |
| 11: | stereo vision eyeglasses |
| 12, 12A-12H: | virtual object |
| 13: | computer |
| 14: | marker |

PREFERRED EMBODIMENTS FOR CARRYING OUT THE INVENTION

In the following, embodiments of the present invention are described with reference to figures.

First Embodiment

Figure 1:
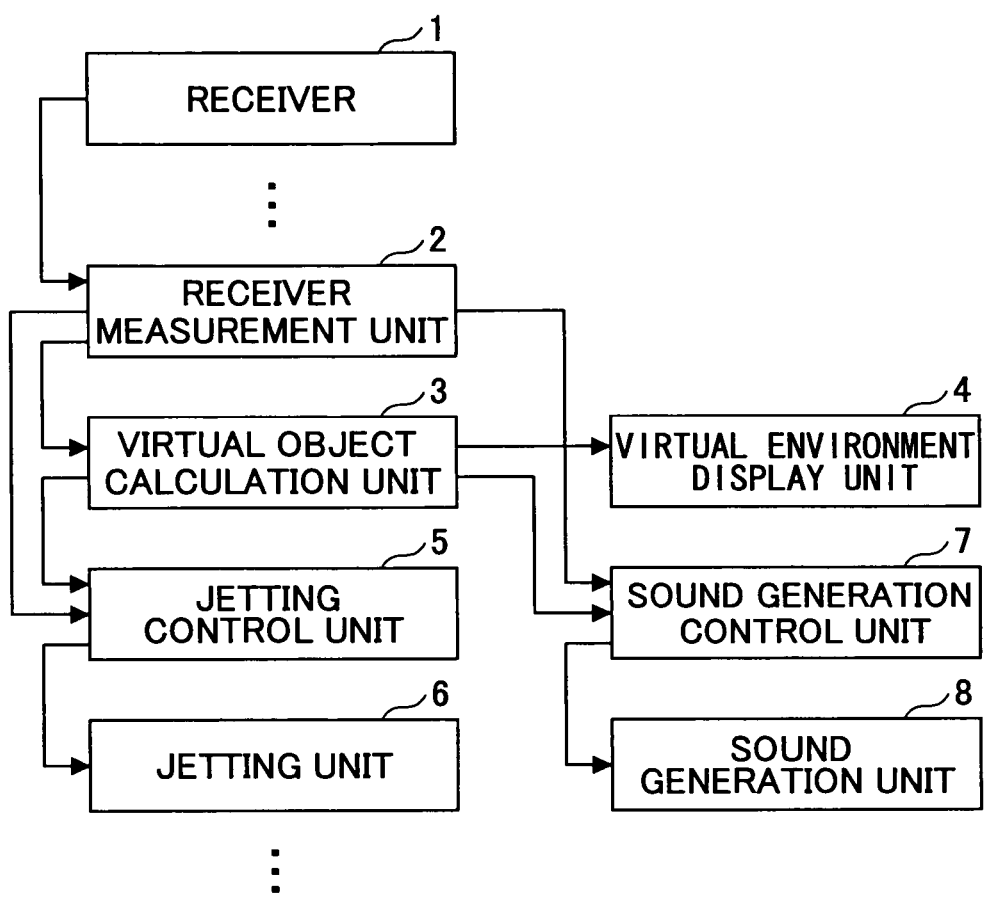
FIG. 1 is a block diagram of a force feedback apparatus in the first embodiment.
Figure 2:
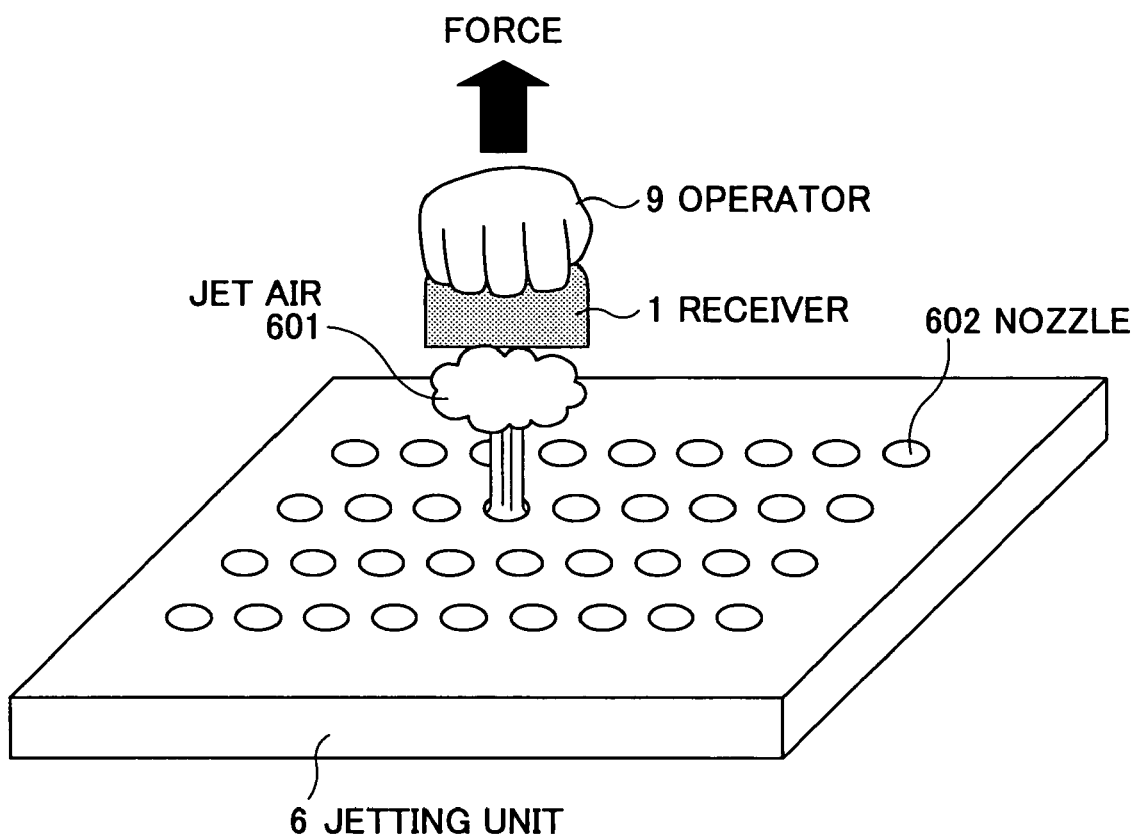
FIG. 2 is a schematic diagram indicating relationships among a receiver, nozzles and an operator in the force feedback apparatus in the first embodiment.
Figure 3:
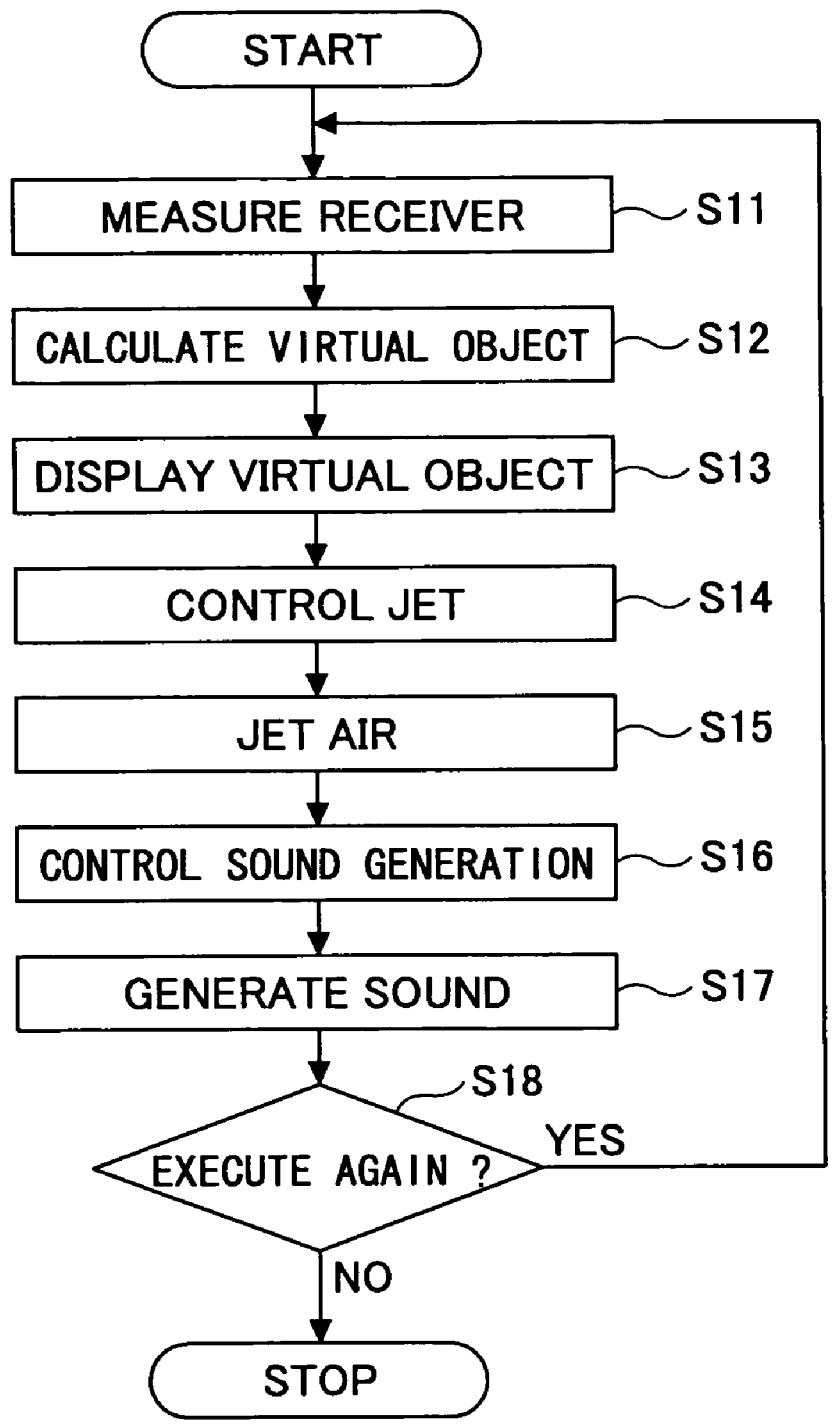
FIG. 3 is an operation flowchart showing operation of the force feedback apparatus in the first embodiment.

FIG. 1 is a block diagram of a force feedback apparatus in the first embodiment, FIG. 2 is a schematic diagram indicating relationships among a receiver, nozzles and an operator, and FIG. 3 is an operation flowchart of the force feedback apparatus.

As shown in FIG. 1, the force feedback apparatus in this embodiment is connected to a receiver measurement unit 2, a virtual environment display unit 4, a jetting unit 6, and a sound generation unit 8, and includes a virtual object calculation unit 3, a jet control unit 5, and a sound generation control unit 7. The operator performs operation for the force feedback apparatus using a receiver 1. In the following, each unit is described in detail.

As shown in FIG. 2, the receiver 1 is for receiving jet air 601 jetting from nozzles 602 of the jetting unit 6 (although other gas, liquid and the like can be used, an example using air is explained in this embodiment), and the receiver 1 is held by a hand of the operator 9 or is attached to the hand. As the receiver 1, one that is worn by the operator 9 as it is can be also used. The receiver 1 receives the jet air 601 so that pressure of the jet air 601 is transmitted to the operator as force feedback.

The receiver measurement unit 2 is an apparatus configured to detect the position or the orientation of the receiver 1. As the receiver measurement unit 2, a camera, a magnetic sensor, an ultrasound sensor, an infrared sensor, and an aftermentioned detection apparatus that uses image analysis by markings, and the like can be used.

The virtual environment object calculation unit 3 can be realized by a computer, for example. The virtual environment object calculation unit 3 calculates states (position, shape, color and the like) of the virtual object to be displayed by the virtual environment display unit 4 so as to generate the virtual environment object. For example, the virtual environment object calculation unit 3 generates a virtual object that moves in conjunction with the position of the detected receiver 1. Or, the virtual environment object calculation unit 3 generates a virtual object whose states change according to the position or the orientation of the detected receiver 1, or according to time change or the like. Or, when there exist plural virtual objects, the virtual environment object calculation unit 3 generates a virtual object whose states change according to states of other virtual objects.

The virtual environment display unit 4 displays a virtual environment including the virtual object based on the calculation result of the virtual object calculation unit 3. As the virtual environment display unit 4, a general display or a head mounted display can be used. In addition, as the virtual environment display unit 4, a projector that projects the virtual object on the jetting unit 6 can be used.

In this case, an optical or magnetic position tracking apparatus detects the viewpoint positions of the operator so that the virtual environment can be displayed according to viewpoints of the operator. In addition to that, the operator may wear a head mounted display for displaying virtual environment images according to positions of right and left eyes of the operator or wear stereo vision eyeglasses so that the operator can see the virtual environment stereoscopically.

The jet control unit 5 controls the amount of air jetted from the nozzles 602, based on the position or the orientation of the nozzles 602 of the jetting unit 6, according to the position or the orientation of the receiver 1 measured by the receiver measurement unit 2 or according to states of virtual objects in the virtual environment. For example, the jet control unit 5 determines a particular nozzle 602 from which air is to be jetted, and jetting direction of the air according to the position and the orientation of the receiver 1 so as to provide proper force feedback to the operator. In addition, since there may be a case in which the state of the virtual object is determined by factors other than the position or the orientation of the receiver 1, the jetting amount of the air jetted from the particular nozzle 602 may be determined according to the state of the virtual object. This jet control unit 5 can be realized by a computer.

As shown in FIG. 2, the jetting unit 6 is an apparatus configured to include plural nozzles and configured to jet air from each nozzle. In addition, it can be configured to be able to change jetting direction of the air.

The sound generation control unit 7 determines attributes (tone quality, scale, loudness, intensity, sound pitch, generating timing, generating term, number of generating times, and the like) of sounds generated by the sound generation unit 8 according to the position or the orientation of the receiver 1 measured by the receiver measurement unit 2 or according to the state of the virtual object. As the sound generation control unit 7, a computer can be used. For example, the control can be realized by sending a MIDI message from a computer to a MIDI sound source.

As the sound generation unit 8, a MIDI sound source that can perform control using the MIDI message, that is, using data of signals conforming to the MIDI standard can be used. The sound generation unit 8 can be configured by a MIDI sound source module such as a synthesizer, an amplifier and a speaker. In addition, the sound generation unit 8 may be configured by a sound card that synthesizes sounds using a CPU of a computer by software, and the amplifier and the speaker.

In control of attributes of sounds according to the position or the orientation of the receiver 1, for example, according to any one of two-dimensional position, height, speed and acceleration of the receiver 1 or according to any combination of plural these items, the sound generation control unit 7 determines any one of tone quality, scale, loudness, sound pitch, intensity, length, generation timing of sound, number of times of generating sound when generating single sound continuously, time intervals when generating single sound continuously, how sound vibrates, and how an echo applies to sound, or determines a combination of plural items of these, so as to control the sound generation unit 8. In addition, according to any one of two-dimensional position, height, speed or acceleration of the receiver 1 or according to a combination of plural items of these, the jet control unit 5 determines a nozzle from which air is jetted and a jet air amount or a jetting direction, so as to control the jetting unit 6. In addition, arranging the virtual object to which the attributes of sounds are assigned in the virtual environment, the virtual object calculation unit 3 changes the shape, the position, or movement speed of the virtual object according to the position or the orientation of the receiver 1.

The virtual object calculation unit 3, the jet control unit 5 and the sound generation control unit 7 in the force feedback apparatus of this embodiment and other embodiments can be realized by installing, into a computer, a program for causing the computer to perform processes of these function units. The program can be provided by recording the program into a recording medium such as a CD-ROM and the like, or can be provided via a network.

Next, the process procedure is described with reference to FIG. 3. First, the receiver measurement unit 2 detects the position or the orientation of the receiver 1 that is held by the operator or is attached to the operator (step 11). Next, the virtual object calculation unit 3 calculates states (position, shape, color and the like) of the virtual object in the virtual environment according to the position or the orientation of the receiver measured by the receiver measurement unit 2 (step 12).

Next, the virtual environment display unit 4 displays a virtual environment including the virtual object based on the calculation results by the virtual object calculation unit 3 (step 13). In addition, the jet control unit 5 controls the air jet amount or the direction for each nozzle according to the position or the orientation of the receiver measured by the receiver measurement unit 2 or according to states of the virtual objects in the virtual environment (step 14).

The jetting unit 6 jets air from a particular nozzle under control of the jet control unit 5 (step 15). In addition, the sound generation control unit 7 controls the attributes of sounds (tone quality, scale, loudness, intensity, sound pitch, generating timing, generating term, number of generating times, and the like) to be generated by the sound generation unit 8 according to the position or the orientation of the receiver measured by the receiver measurement unit 2 or according to states of the virtual object in the virtual environment (step 16). Then, the sound generation unit 8 generates a sound having the attributes specified by the sound generation control unit 7. After that, when performing the event processing again, processes from step 11 are performed.

In the above-mentioned processing, the process of step 13, processes of steps 14-15, and processes of steps 16-17 are not necessarily performed in this order. These processes may be performed in parallel.

Figure 4:
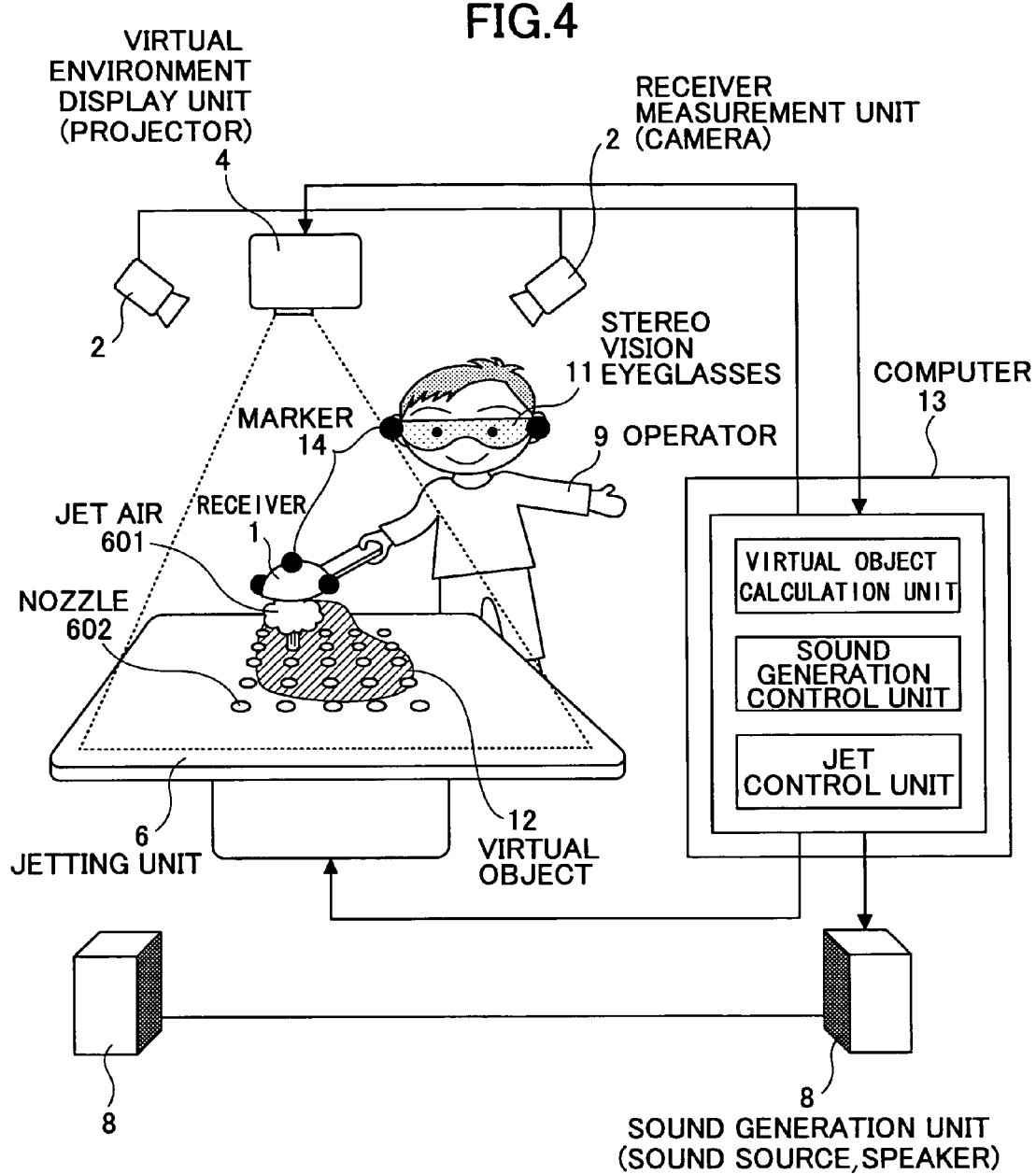
FIG. 4 is a figure for explaining operation of the force feedback apparatus in the first embodiment.

FIG. 4 is a figure showing a concrete example of the configuration shown in FIG. 2. In this example, an image is projected on a region where force feedback is actually provided using a projector as the virtual environment display unit 4, and the operator 9 wears the stereo vision eyeglasses 11. This method reduces the workload for the operator 9. According to this system, by displaying the virtual object 12 stereoscopically on the region (region where the plural nozzles 602 are placed) where force feedback is performed in the jetting unit 6, the position where the object is visually displayed and the position where force feedback is provided can be matched, so that the operator can obtain intuitive experience. In addition, since air is used for transmitting the force sense in this system, there is a feature that image displaying is not obstructed.

As examples of the images and the stereo vision eyeglasses 11, there are red/blue images and red/blue eyeglasses, polarized projection image and polarizing eyeglasses, right/left images being switched by time division and shutter eyeglasses.

This system integrates the virtual object 12 of the stereoscopic image, displayed by the virtual environment display unit 4, corresponding to viewpoints of both eyes of the operator 9 with force feedback by the jetting unit 6. Accordingly, a projector as the virtual environment display unit 4 is attached at a position directly above a desk in which nozzles as the nozzles 602 are embedded, so that images of the virtual environment generated by the virtual object calculation unit 3 configured by the computer 13 are projected on the desk. The images of the virtual environment are left/right virtual environment images obtained by viewing the virtual object 12, that is assumed to exist on the desk, from the viewpoint positions of the left and right eyes of the operator 9.

In addition, by attaching markers 14 at positions near the left and right eyes of the stereoscopic vision eyeglasses 11 worn by the operator 9, and by detecting the markers 14 using an optical detection unit (camera and the like) that is different from the receiver measurement unit 2, the viewpoint positions of the operator 9 can be detected. Accordingly, the stereoscopic image corresponding to viewpoints of the operator 9 can be projected without directly detecting the positions of the left and right eyes of the operator 9, so that the virtual object 12 can be displayed such that it rises up above the nozzles 602 of the jetting unit 6 in space, and the virtual object 12 can be visually presented. In this example, markers 14 can be also attached to the receiver 1 such that the receiver measurement unit 2 can detect the position or the orientation of the receiver 1.

Figure 5A:
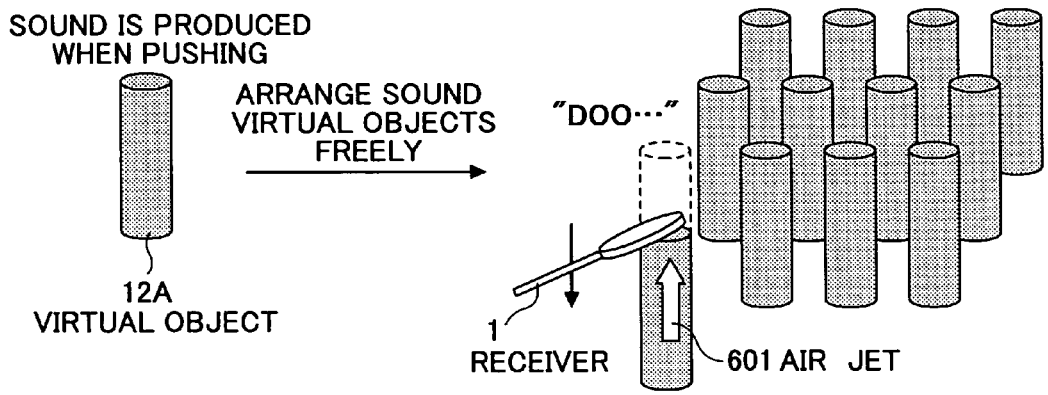
FIG. 5A is a figure (1) for explaining a virtual object displayed in a virtual environment by the force feedback apparatus in the first embodiment.

Concrete examples of the virtual object 12 are shown in FIGS. 5A-5D. FIG. 5A shows an example for generating virtual objects 12A to each of which a scale is assigned and arranging the virtual objects 12A the number of which corresponds to a necessary number of scales. Plural virtual objects 12A are assigned to plural nozzles 602. By pushing down a jet of air 601 from a particular nozzle 602, the sound of a scale of a particular virtual object 12A corresponding to the particular nozzle 602 is generated. At this time, force feedback due to air pressure from the pushing down direction is applied to the receiver 1. The virtual objects 12A can be freely arranged. For example, it can be considered to arrange the virtual objects 12A as the scales like a matrix in the order of scales. In addition, it can be considered that the virtual objects 12A are arranged like a keyboard of a piano by dividing scales into diatonic scales and chromatic scales. In addition, the virtual objects 12A can be arranged irrespective of scales.

In addition, attributes can be assigned to the virtual objects 12A such that attributes of sounds to be generated change according to the height of the receiver 1, from the nozzle 602, receiving the pressure of the jet of air 601 (for example, sound of "do" is extended like "doo . . . "). In this case, by pushing down the jet of air 601 using the receiver 1, the virtual object 12A can be changed such that it moves to the pushing down direction (the example of FIG. 5A), is dented, or swells.

Figure 5B:
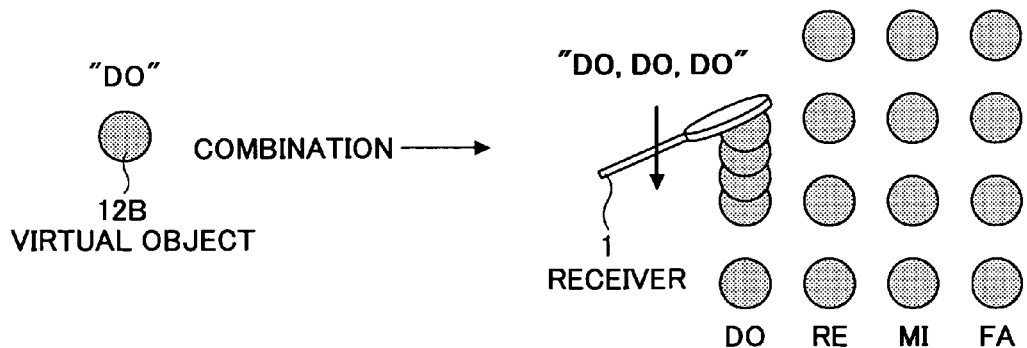
FIG. 5B is a figure (2) for explaining a virtual object displayed in a virtual environment by the force feedback apparatus in the first embodiment.

FIG. 5B shows another example of the virtual object 12. In this example, plural round virtual objects 12B are arranged from top to bottom. By moving the receiver 1 such that the receiver 1 touches on the top side of the virtual objects 12B, a single sound "do" (which is shorter than "do" in the case of FIG. 5A) is produced. Then, by moving down the receiver 1, the single sound is repeated like "do, do, do". In addition, by moving down the receiver 1, the virtual objects 12B are moved down. At this time, by pushing down the jet air 601 with the receiver 1, the virtual objects 12B gather downward, so that the more the receiver 1 is moved down, the more the number of the virtual objects 12B gathered below increases. As a result, as the receiver is moved down, the number of repetitions of the single sound increases.

Figure 5C:
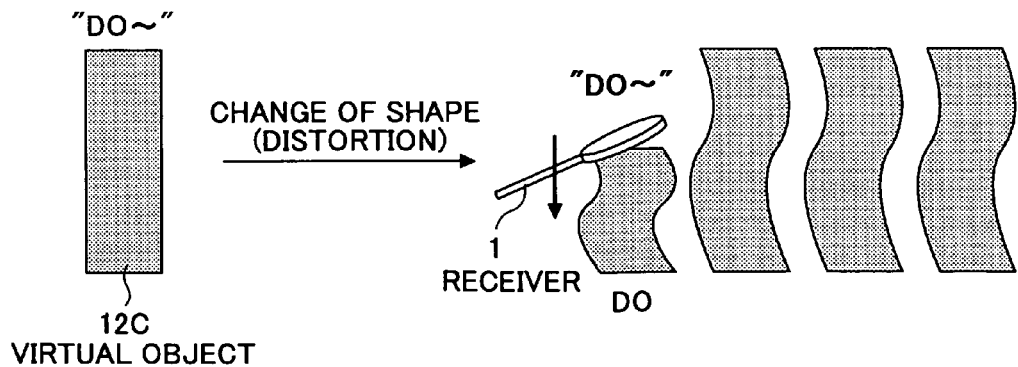
FIG. 5C is a figure (3) for explaining a virtual object displayed in a virtual environment by the force feedback apparatus in the first embodiment.

FIG. 5C shows still another example of the virtual object 12. In this example, according to the height of the receiver 1 from the nozzles 602, a pitchbend that twists a musical interval can be operated. In this case, according to pushing down the receiver 1, the shape of the virtual object 12C can be compressed and deformed.

Figure 5D:
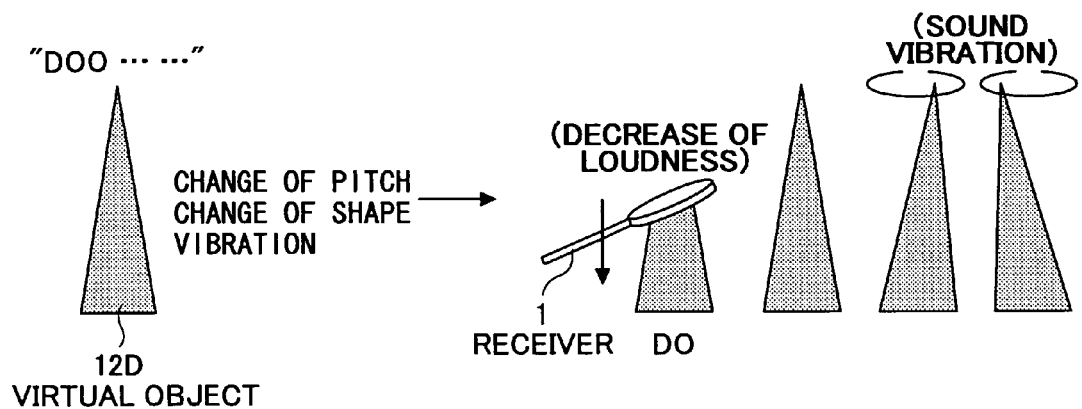
FIG. 5D is a figure (4) for explaining a virtual object displayed in a virtual environment by the force feedback apparatus in the first embodiment.

FIG. 5D shows still another example of the virtual object 12. In this example, according to the height of the receiver 1 from the nozzle 602, loudness is changed or sound vibration is changed. In this case, according to pushing down the receiver 1, the shape of the virtual object 12D is changed or the virtual object 12D is shaken.

Figure 6A:
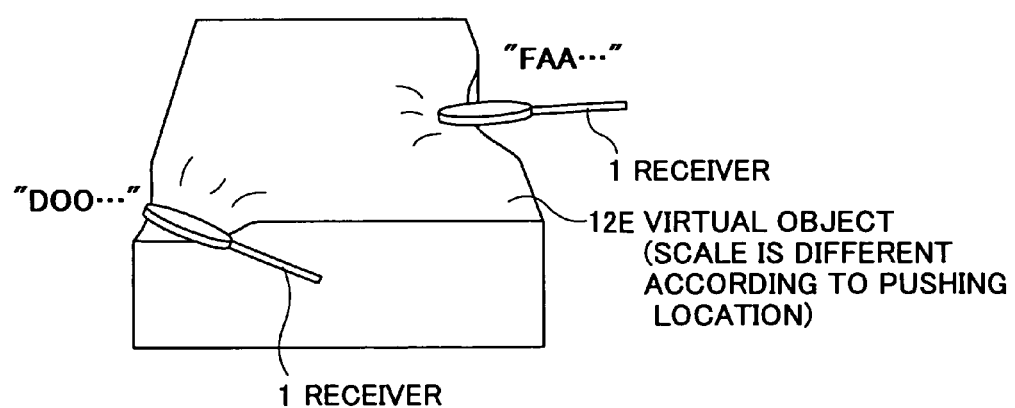
FIG. 6A is a figure (1) for explaining another example of a virtual object displayed in a virtual environment by the force feedback apparatus in the first embodiment.

FIGS. 6A-6D show other examples of the virtual object 12. FIG. 6A shows an example in which one virtual object 12E is used and plural sound attributes are assigned to the virtual object 12E so that each sound is represented according to events by the receiver 1. For example, sound attributes are assigned to each region of the virtual object 12E. In this case, when the operator pushes down one portion of the virtual object 12E, a different sound is produced according to the region where the portion exists. Scale or degree of vibrato can be changed according to a place where the virtual object 12E is pushed, and according to deepness of pushing down or height. When scales are assigned to the regions, a starting sound is determined according to the place that is pushed down, and the sound is produced; by moving the receiver 1 from side to side keeping the pushing state, the sound changes while continuing to sound. In addition, even after removing the receiver 1 from the region to which a sound attribute is assigned, the sound of the attribute can be continued to sound for a while. In this case, by moving the receiver 1 from side to side, sounds overlap so that plural sounds sound.

Figure 6B:
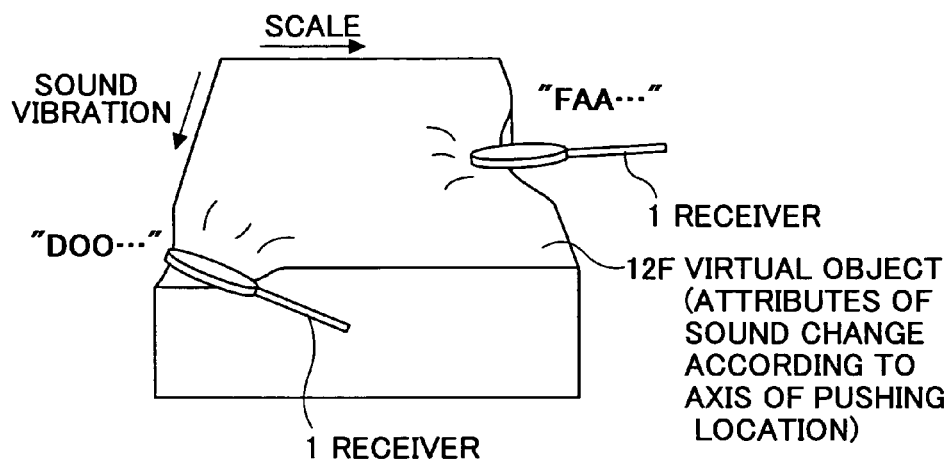
FIG. 6B is a figure (2) for explaining another example of a virtual object displayed in a virtual environment by the force feedback apparatus in the first embodiment.

In addition, as shown in FIG. 6B, a virtual object can be provided in which scales are assigned to one axis (left and right direction, for example) and sound vibrations are assigned to another axis (back-and-forth direction, for example). In this case, by moving the receiver 1 in two-dimensional directions in the virtual object 12F, the attribute of the sound can be changed.

Figure 6C:
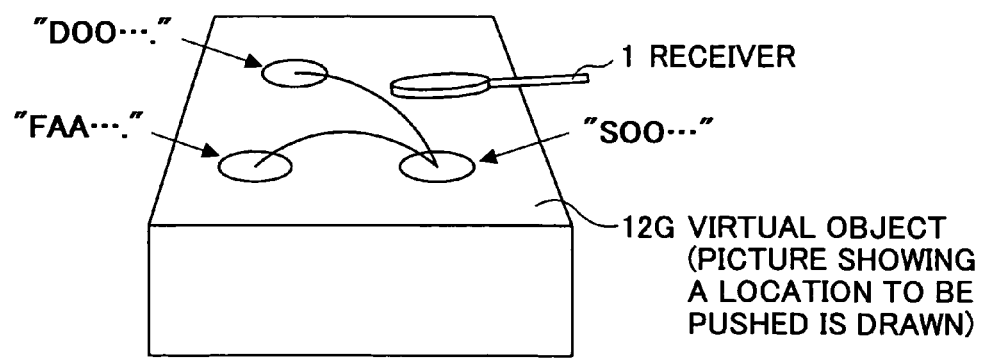
FIG. 6C is a figure (3) for explaining another example of a virtual object displayed in a virtual environment by the force feedback apparatus in the first embodiment.

In addition, as shown in FIG. 6C, by preparing a virtual object 12G whose shape is changed freely or to which a new object can be added, a musical score for this musical instrument can be represented for indicating locations to be pushed and the pushing order for playing music. As a concrete method, the musical score of the musical instrument can be represented by changing the shape of the virtual object 12G, by moving the virtual object 12G, by changing the color, or by adding a new object. In addition, the musical score can also be represented by drawing a picture on the surface of the virtual object 12G by putting texture on it. These can be dynamically changed in synchronization with music. By the way, this technique can also be used in the case (FIG. 5) in which plural virtual objects having sound attributes are used.

Figure 6D:
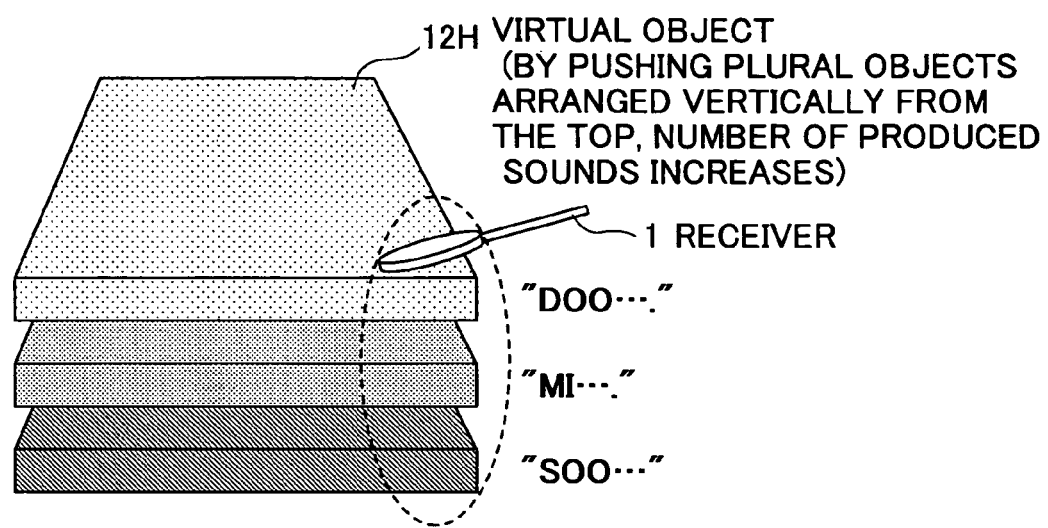
FIG. 6D is a figure (4) for explaining another example of a virtual object displayed in a virtual environment by the force feedback apparatus in the first embodiment.

In addition, as shown in FIG. 6D, it can be considered that, by bringing the plural virtual objects 12H into contact with the receiver 1 at the same time, sounds of plural attributes are produced and sounds are added. For example, by arranging the virtual objects 12H corresponding to plural sounds in a vertical direction and by pushing down the receiver 1 from the top, the number of sounds to be produced can be increased. Accordingly, an expression such as a chord becomes possible. In addition, in the same way, the number of kinds of the musical instruments can be increased, and a chorus can be realized.

Figure 7:
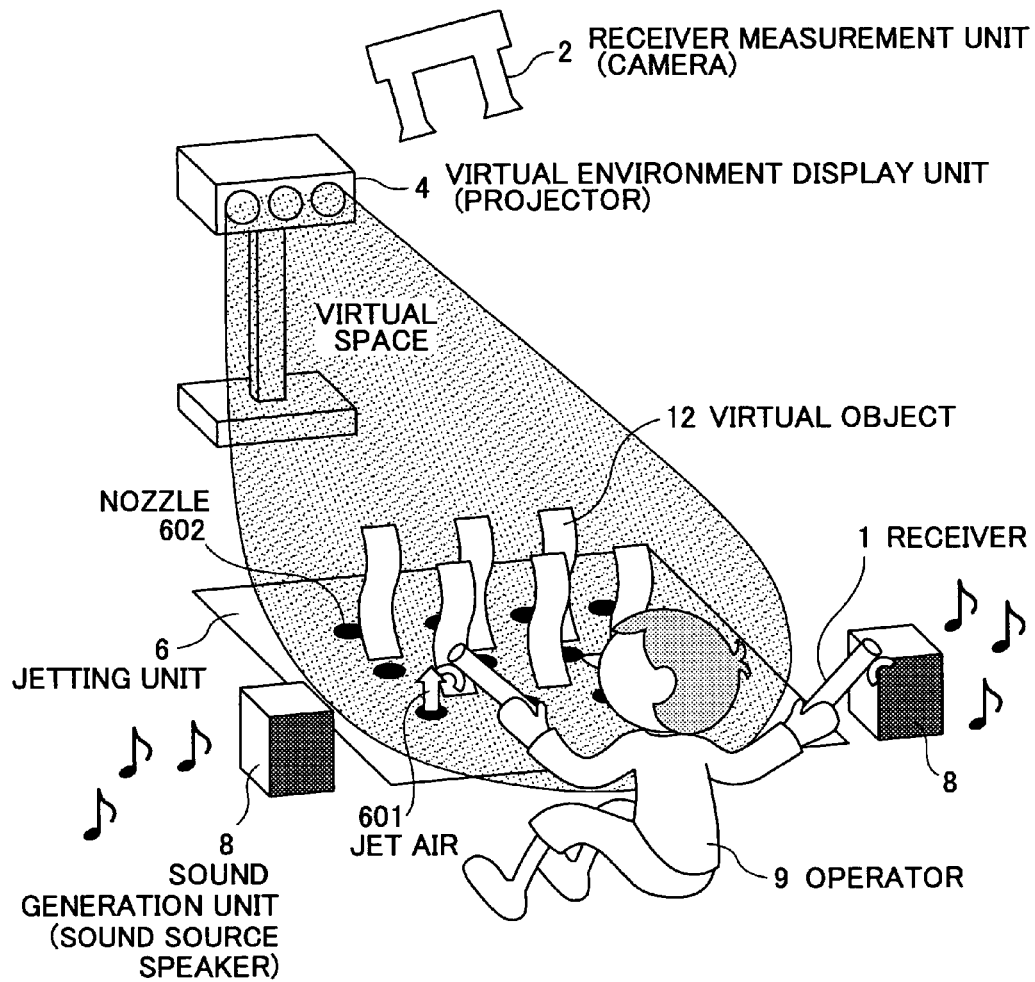
FIG. 7 is a figure for explaining music play using the force feedback apparatus in the first embodiment.

FIG. 7 is a schematic diagram for playing music using the above-mentioned force feedback apparatus. In the example shown in FIG. 7, the virtual object 12 is displayed in the virtual environment of images produced by a projector as the virtual environment display unit 4. Then, the operator 9 holds an operating bar as the receiver 1 over the jet of air 601 of the nozzle 602. As a result, the shape of the virtual object 12 changes, and force feedback by the jet air 601 is provided to the receiver 1 at the same time. Then, music produced according to the position or the orientation of pushing down the receiver 1 and according to differences of the nozzles 602 opposed to the receiver 1 is output from the speaker as the sound generation unit 8.

(Nozzle Placement Method)

In the above-mentioned force feedback apparatus, in a case when the receiver 1 has a size that sufficiently covers the nozzle directly above it, even though the center of the receiver is not at a position directly above the nozzle jetting air, the receiver can receive the jet since the center of the receiver is at a position of a periphery of the nozzle. Therefore, even when the receiver is located between a nozzle and another nozzle, since the force can be received by the receiver, plural nozzles may be placed at long intervals. However, for example, if the nozzles are placed at too wide intervals, there may be a case in which the pressure received by the receiver, that is, force feedback, is not enough.

In the following, a configuration of the jetting unit 6 that enables the receiver 1 to stably receive the pressure is described.

Figure 8A:
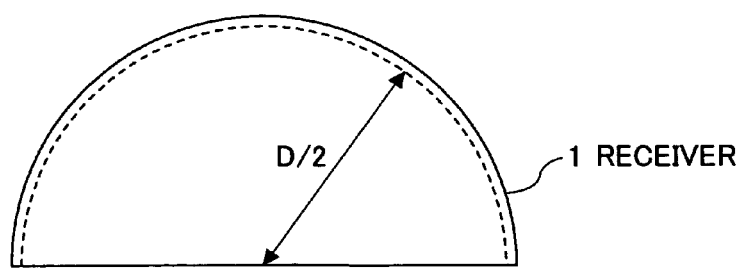
FIG. 8A is a side view of a hemispheric receiver.
Figure 8B:
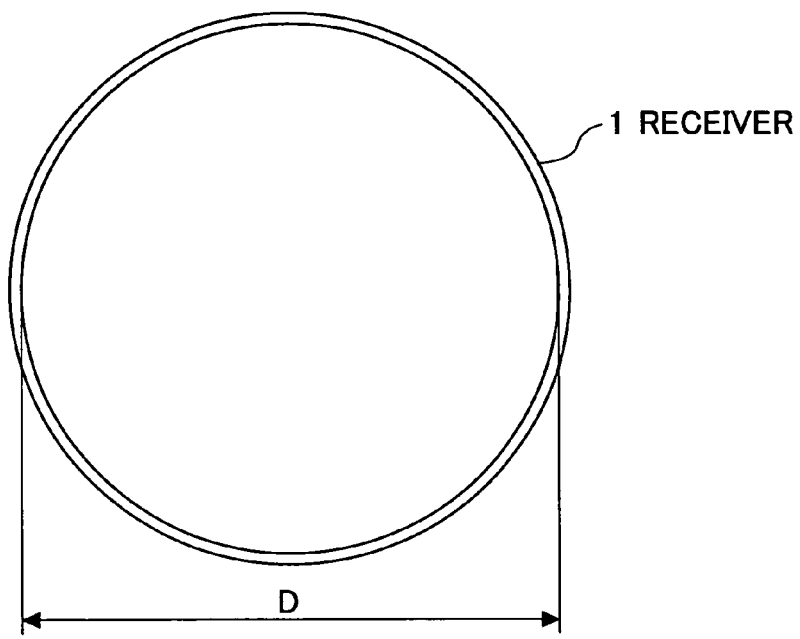
FIG. 8B that is a bottom view of a hemispheric receiver.

In this example, a placement interval (pitch) of the nozzles 602 with respect to the size of the receiver 1 is defined. A concrete example is described below. As shown in FIG. 8A that is a side view and in FIG. 8B that is a bottom view, assuming that the receiver 1 has a concave hemispheric shape and that the diameter (the internal diameter) is D, the nozzle 602 is placed such that at least one nozzle 602 exists in a circular region of 0.8×D.

Figure 9A:
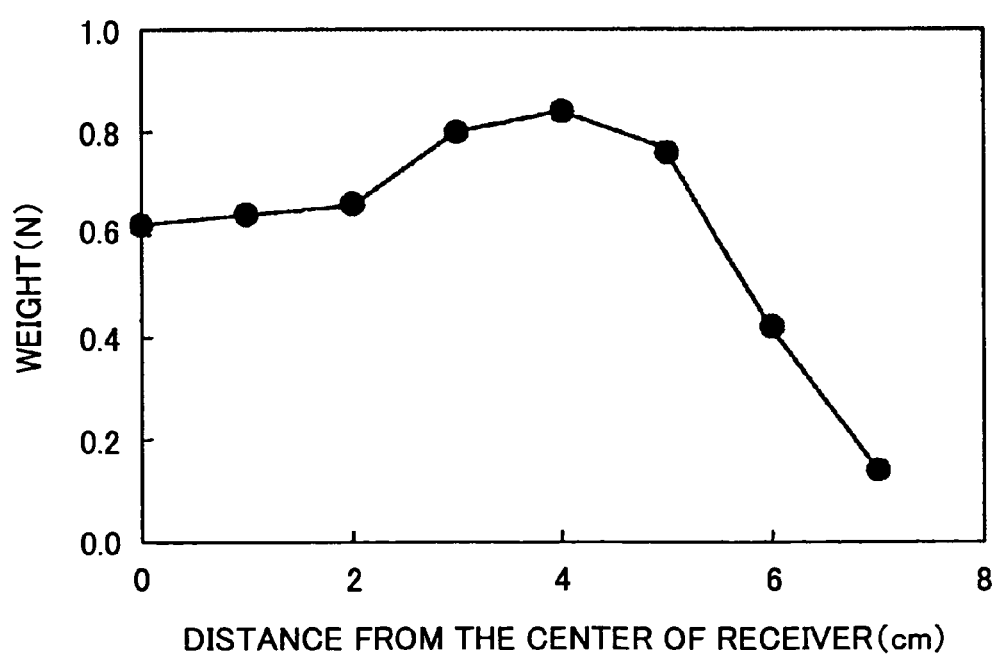
FIG. 9A is a figure showing weight characteristics when the hemispheric receiver receives jet air.

This constant of 0.8 is based on the measurement result shown in FIG. 9A. FIG. 9A is a graph showing a result of measuring weight applied to the hemispherical receiver 1 that receives a jet of air from the nozzle while moving the position of the receiver 1 with respect to the nozzle. The vertical axis shows the weight and the horizontal axis shows a distance between the center position of the receiver that receives the jet of air and the center of the nozzle. As the receiver, a hemispherical one having a diameter D=10 cm is used, and the nozzle is placed at a position 20 cm below the hemisphere section of the receiver. As shown in FIG. 9A, as to the receiver having the diameter D=10 cm, the weight received by the receiver once becomes strong when the distance between the center position of the receiver and the nozzle is near 4 cm, and after exceeding this distance, the weight weakens abruptly.

In the following, based on this result, change of the weight when the receiver 1 moves between two nozzles is described. In this example, two nozzles (A, B) are arranged and the center position of the receiver 1 is moved from a position directly above the nozzle A to a position directly above another nozzle B, and it is assumed that the nozzle that jets air is switched from the nozzle A to the nozzle B when the center position of the receiver 1 crosses a position directly above the mid-way point between the nozzles A and B. That is, at this time, air jetting from the nozzle A stops and air starts to jet from the nozzle B.

Figure 9B:
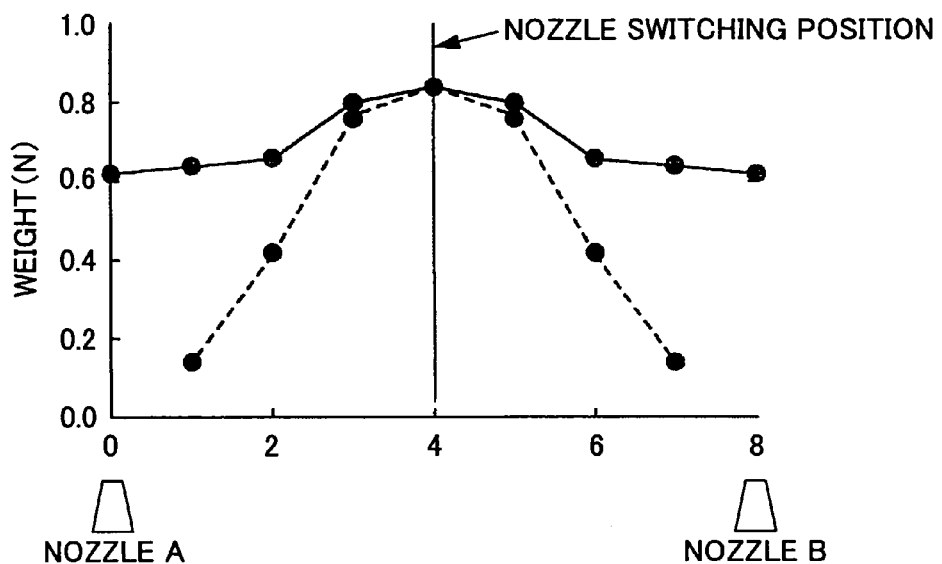
FIG. 9B is a figure showing weight characteristics when the hemispheric receiver receives jet air.

FIG. 9B shows an estimation of change of weight received by the receiver 1 when the nozzle A and the nozzle B are placed at an interval of 8 cm, and when the receiver 1 is moved from a position 20 cm above the nozzle A to a position 20 cm above the nozzle B in which the jetting nozzle is changed from the nozzle A to the nozzle B. This figure corresponds to one obtained by folding a portion of 0 cm~4 cm of the horizontal axis of FIG. 9A to the side of 4 cm~8 cm using a line extending vertically from the part at 4 cm of the horizontal axis as a folding axis. By the way, the dotted line indicates a graph corresponding to the part equal to or larger than 4 cm in the horizontal axis in FIG. 9A.

In this example, since the distance between the nozzle A and the nozzle B is 8 cm, the jetting nozzle is switched from the nozzle A to the nozzle B when the distance between the nozzle A and the center of the receiver exceeds 4 cm. As shown in the figure, the change of the weight is shaped like one mountain.

Figure 9C:
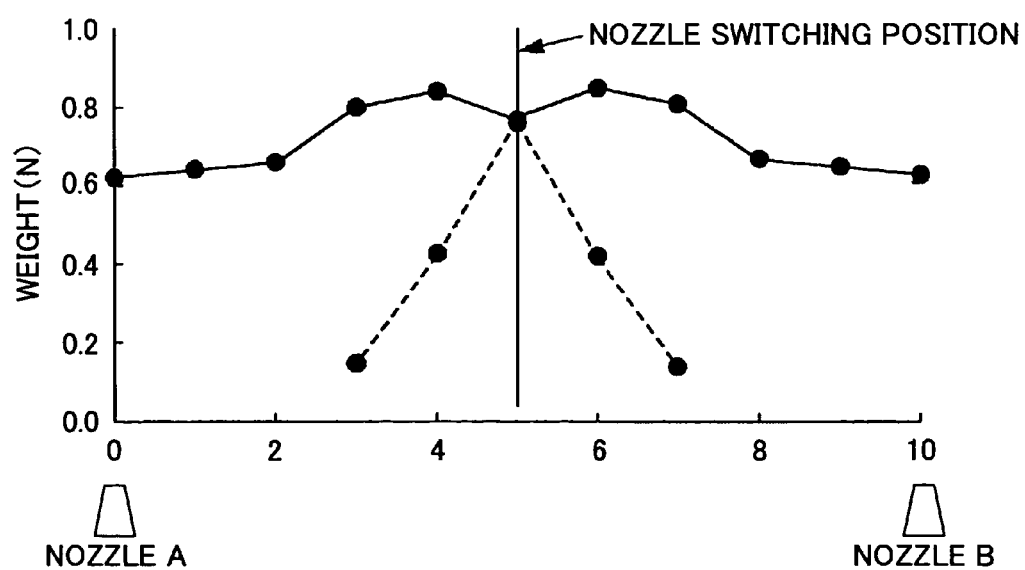
FIG. 9C is a figure showing weight characteristics when the hemispheric receiver receives jet air.

On the other hand, when estimating a case in which the nozzle A and the nozzle B are placed at an interval of 10 cm and the receiver is moved from a position 20 cm above the nozzle A to a position 20 cm above the nozzle B, the change of the weight becomes shaped like two mountains as shown in FIG. 9C. In this case, since the jetting nozzle is switched from the nozzle A to the nozzle B when the distance between the nozzle A and the center of the receiver exceeds 5 cm, FIG. 9C corresponds to one obtained by folding a portion of 0 cm~4 cm of FIG. 9A to the side of 5 cm~10 cm using a line extending vertically from the part at 5 cm of the horizontal axis as a folding axis. As shown in FIG. 9C, the change of the weight indicates two times repetition of rise and fall so that the value of the weight received before and after the switching position changes abruptly, as compared with the case when the distance between the center position of the receiver and the nozzle is equal to or less than 4 cm.

Figure 10A:
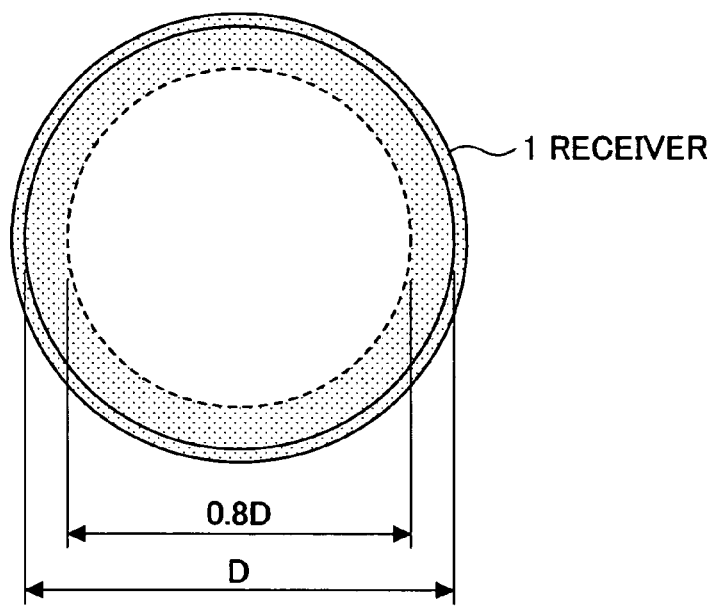
FIG. 10A is a figure (1) for explaining a region of 0.8×D of the receiver of diameter D and a pattern for placing nozzles.

From the above results, in the case when using the receiver 1 of the diameter (inner diameter) of 10 cm, in order that the weight received by the receiver 1 when the nozzle is switched does not change abruptly, it can be understood that it is desirable to place the two nozzles such that the interval between the two nozzles is equal to or less than 8 cm. That is, it is desirable that at least one nozzle be placed in a region within a diameter of 8 cm(=0.8×D). Therefore, the constant in this case is 0.8, and it is adequate that at least one nozzle is placed within a circular region of a diameter of 0.8×D with respect to the hemispheric receiver 1 having the diameter D as shown in FIG. 10A.

Figure 10B:
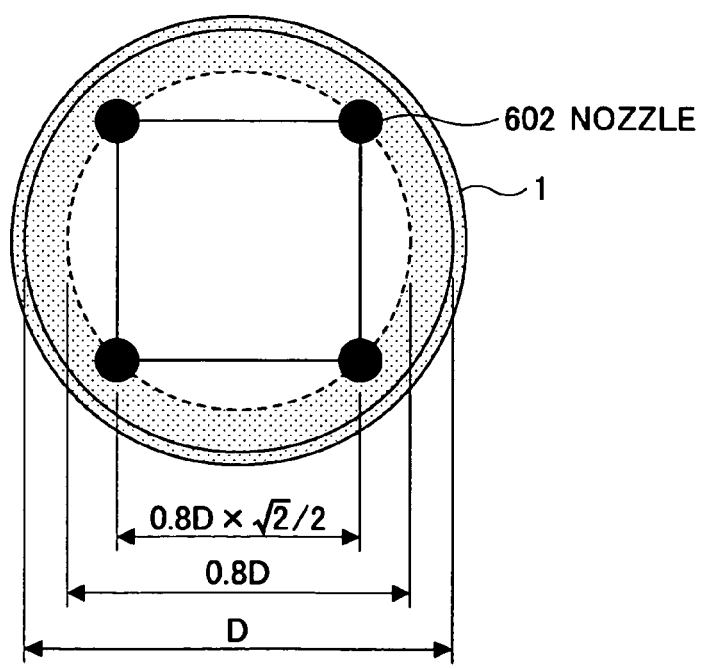
FIG. 10B is a figure (2) for explaining a region of 0.8×D of the receiver of diameter D and a pattern for placing nozzles.
Figure 10C:
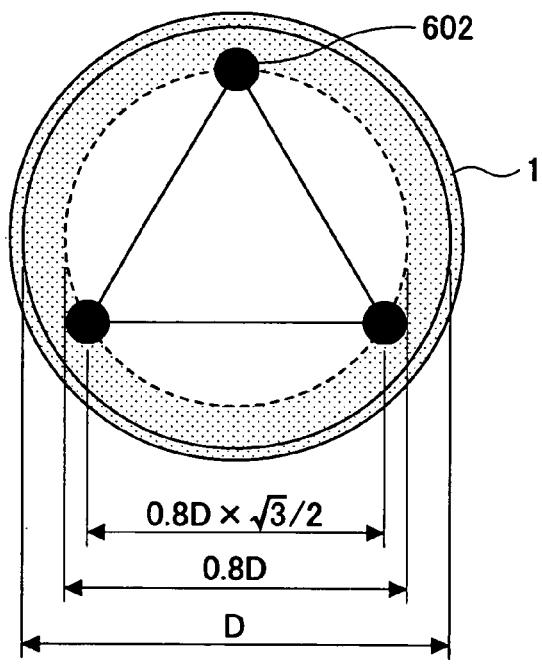
FIG. 10C is a figure (3) for explaining a region of 0.8×D of the receiver of diameter D and a pattern for placing nozzles.
Figure 10D:
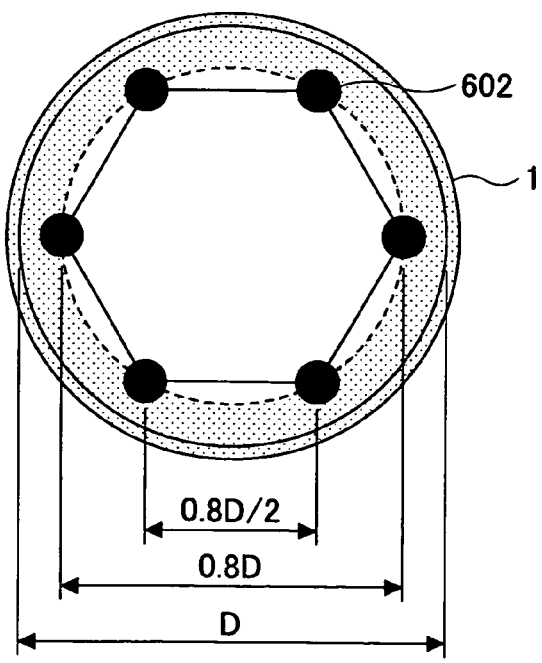
FIG. 10D is a figure (4) for explaining a region of 0.8×D of the receiver of diameter D and a pattern for placing nozzles.

Thus, the interval (pitch) of the nozzles is determined such that at least one nozzle is placed within a circular region of a diameter of 0.8×D. For example, when arranging the nozzles 602 in a lattice pattern, the interval of the nozzles becomes $0.8 \times D \times 2^{1/2}/2$ as shown in FIG. 10B. In addition, when arranging the nozzles 602 like a triangle, the interval becomes $0.8 \times D \times 3^{1/2}/2$ as shown in FIG. 10C. When arranging the nozzles 602 like a hexagon, the interval becomes 0.8×D/2 as shown in FIG. 10D.

By the way, when the receiver 1 has a concave shape that is not a hemisphere, the constant may change, and become 0.6, for example. In the same way as the case shown in FIG. 9A, this constant can be obtained by measuring relationships between the distance of the nozzle 602 from the center of the receiver 1 and the weight, and the constant normally becomes a positive value equal to or less than 1.

Second Embodiment

Figure 11:
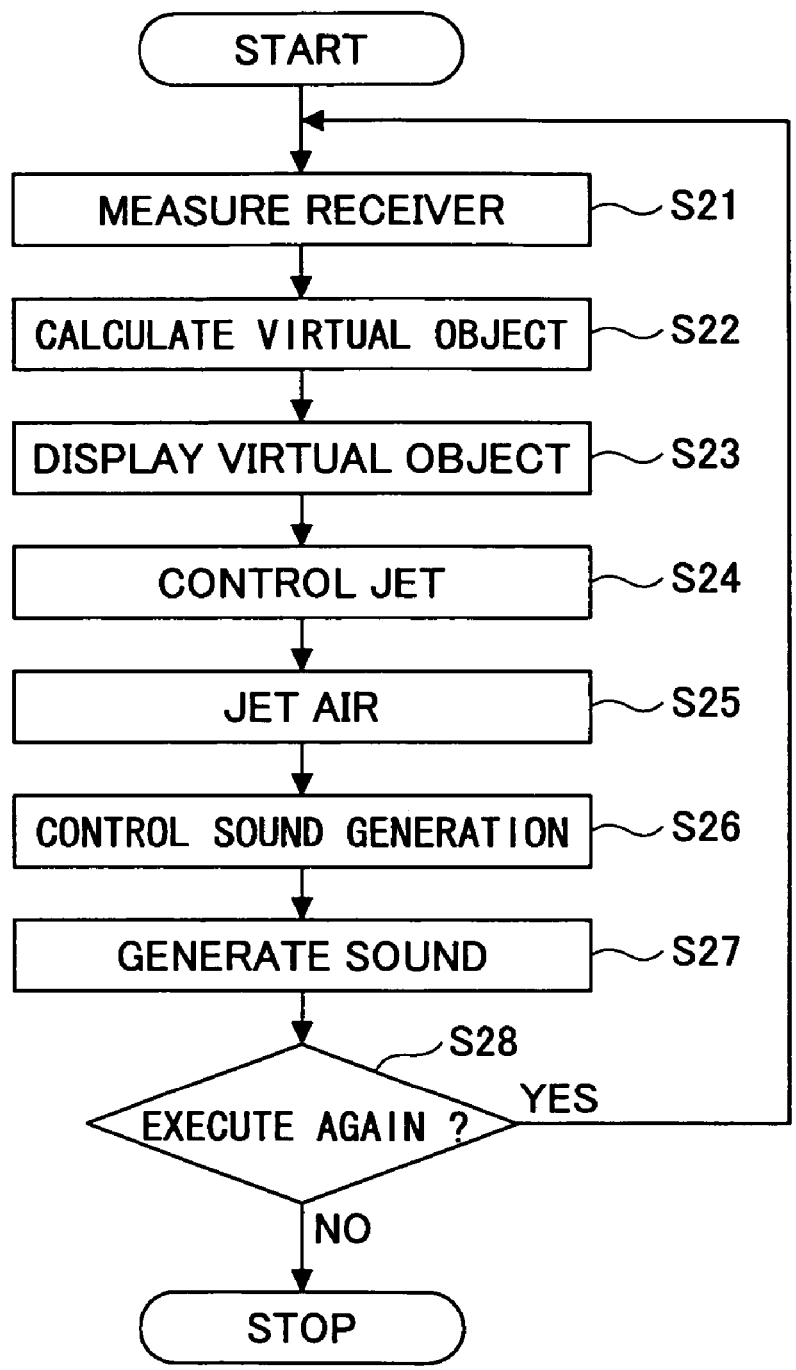
FIG. 11 is a flowchart of operation of the force feedback apparatus in the second embodiment.

FIG. 11 shows a flowchart of processes performed by the force feedback apparatus of the second embodiment. Basic processes in the second embodiment are the same as those of the force feedback apparatus of the before-mentioned first embodiment. Steps 21-28 of FIG. 11 correspond to steps 11-18 of FIG. 3. However, the following points are different from the first embodiment.

In the second embodiment, in step 21, the receiver measurement unit 2 detects the shape or the color of the receiver 1 in addition to the position or the orientation of the receiver 1. Or, the receiver measurement unit 2 detects that the receiver 1 is a particular receiver in addition to the position or the orientation of the receiver 1. In addition, in step 26, the sound generation control unit 7 controls attributes of sounds generated by the sound generation unit 8 according to the identification of the receiver 1, or the shape or the color of the receiver 1 in addition to the position or the orientation of the receiver 1 or the state of the virtual object.

For example, while a produced sound is a piano sound when operating a receiver, the sound can be changed to a drum sound by changing the receiver to another receiver having a different shape or color or having a different receiver number. Or, in a case when two receivers are prepared and the operator 9 uses one of them in each hand, even when the same virtual object is pushed down by each receiver, the sound attribute assigned to the virtual object can be differentiated according to a difference of the receivers, in which the tone quality or the scale can be differentiated, for example.

Third Embodiment

When projecting the virtual environment image using a projector and the like, or when displaying the virtual environment image using the head mounted display and the like, if the nozzle 602 of the jetting unit 6 exists at a place viewed through the image, there may be a problem in that the black hole of the nozzle 602 is conspicuous so as to disturb the image.

Thus, the third embodiment is provided with a nozzle open/close unit 10 (lid) for opening the nozzle 602 only when the air is jetting and closing the nozzle 602 when air is not jetting so that the hole of the nozzle 602 becomes inconspicuous (not sensible).

Figure 12:
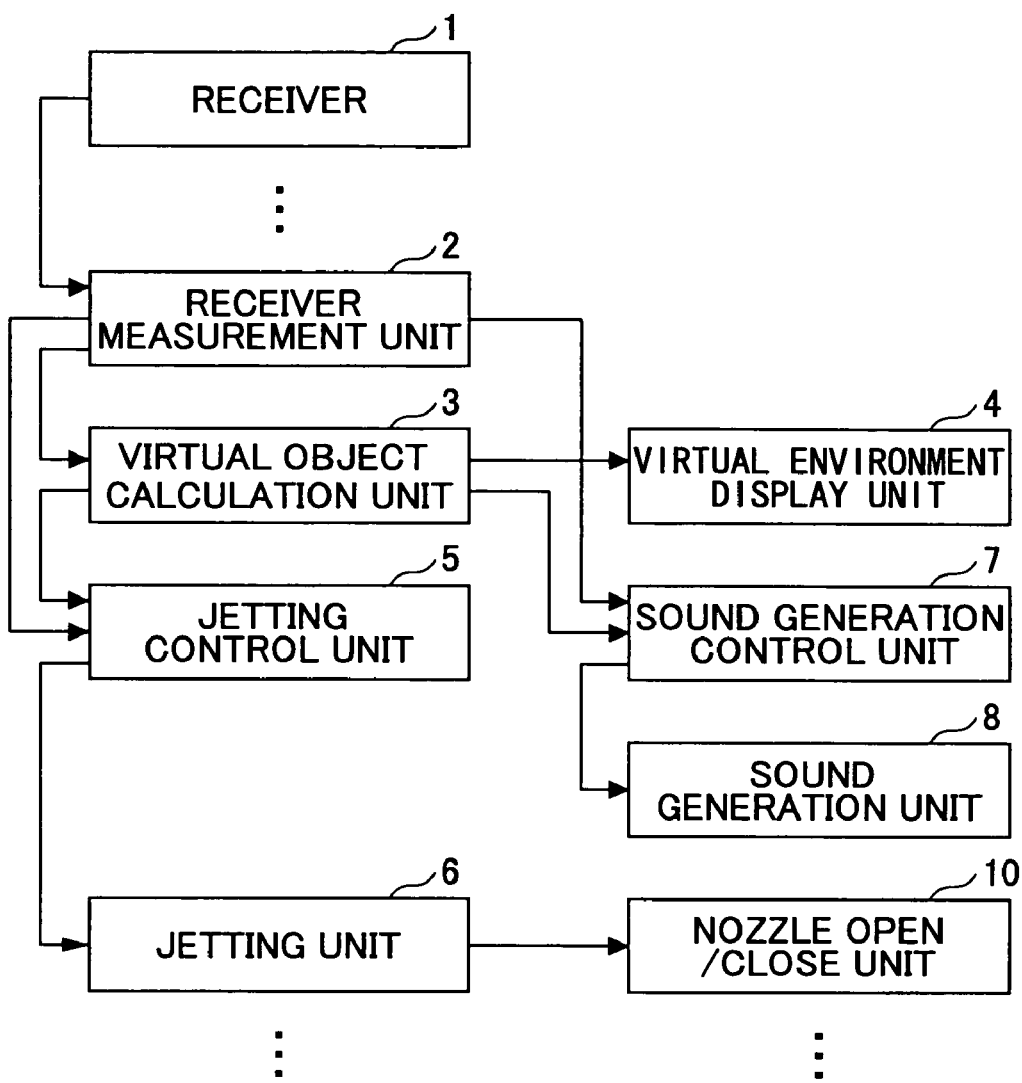
FIG. 12 is a block diagram of the force feedback apparatus in the third embodiment.
Figure 13:
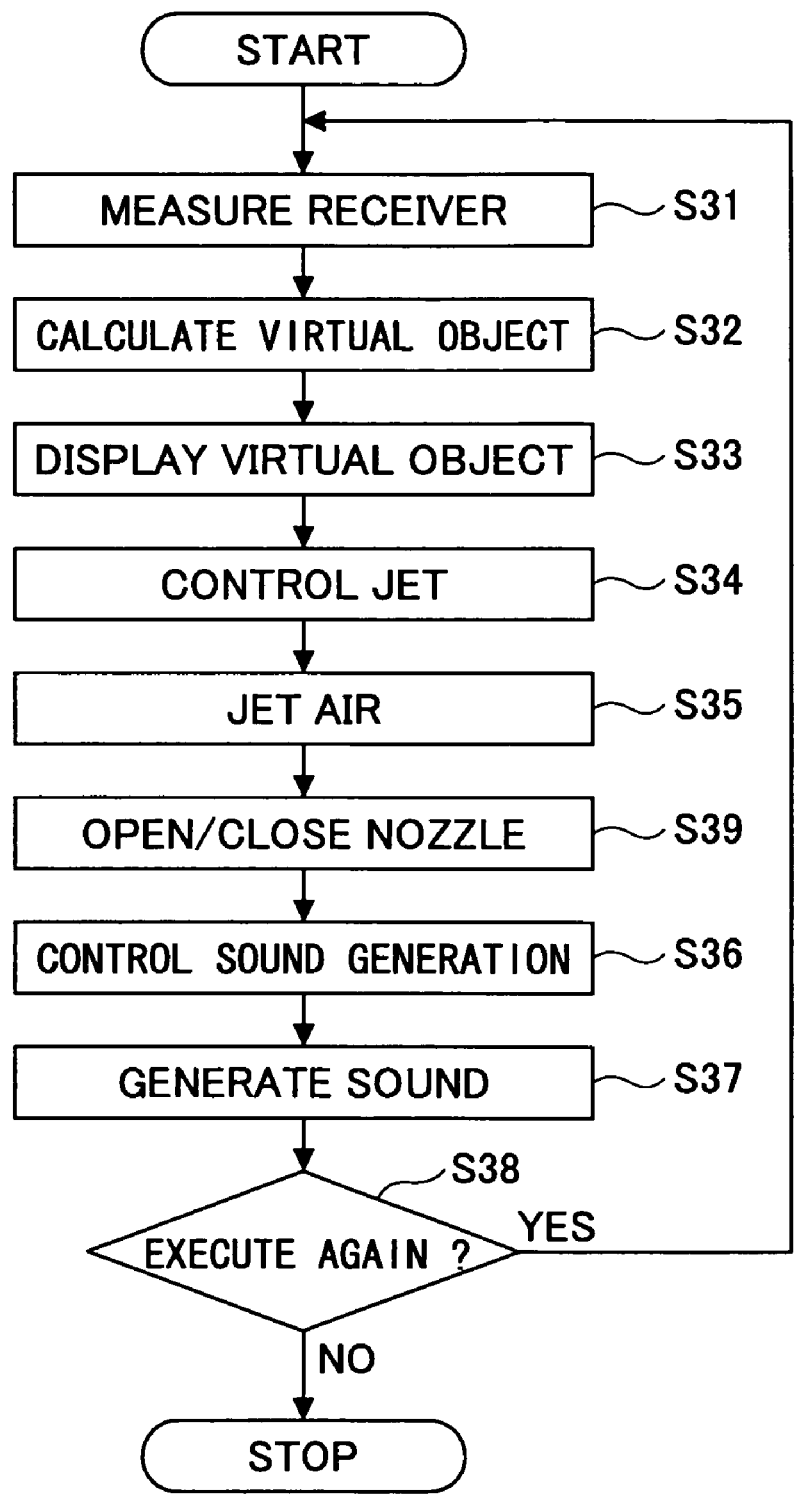
FIG. 13 is a flowchart of operation of the force feedback apparatus in the third embodiment.
Figure 14:
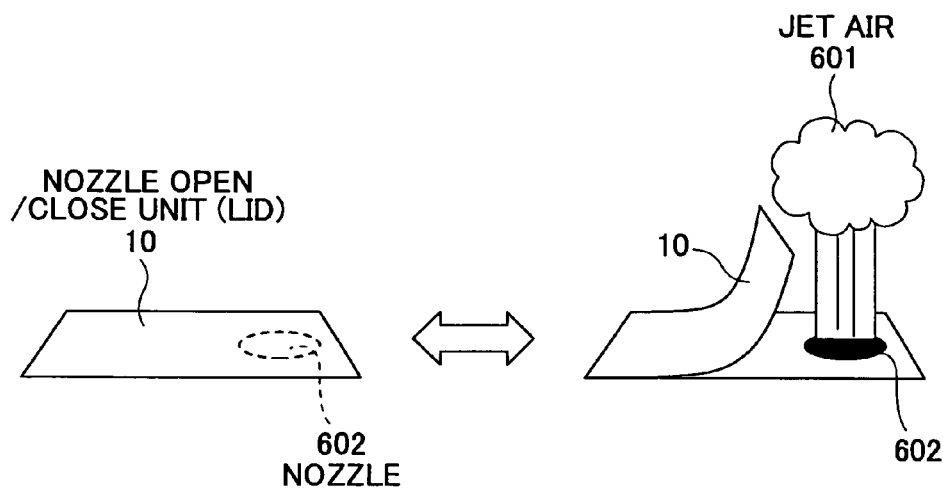
FIG. 14 shows a configuration of the nozzle open/close unit of the force feedback apparatus in the third embodiment.
Figure 15:
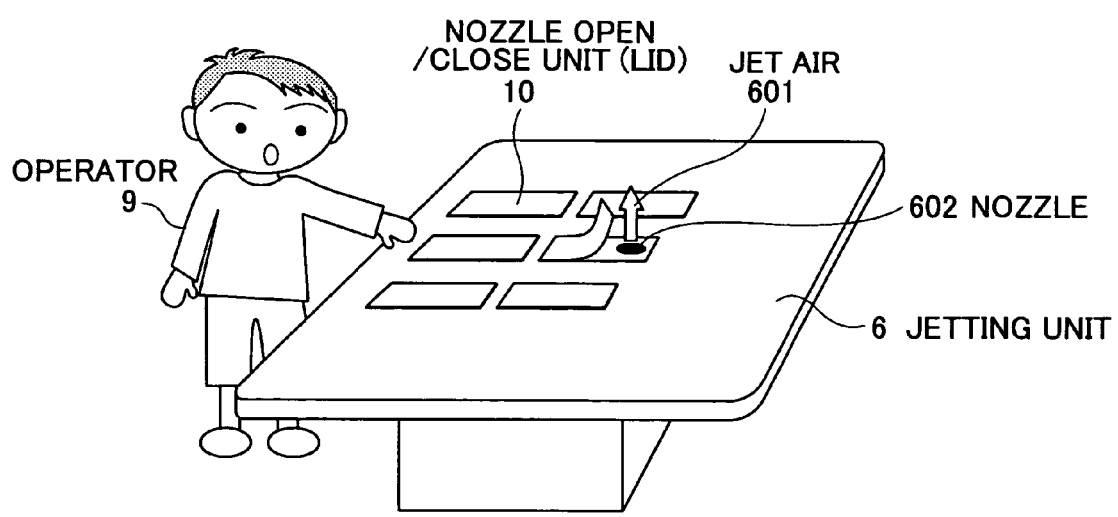
FIG. 15 is a figure for explaining an orientation for attaching the nozzle open/close unit of the force feedback apparatus in the third embodiment.

FIG. 12 shows a configuration of the force feedback apparatus having the nozzle open/close unit 10. FIG. 13 shows a flowchart of the operation. FIG. 14 shows a configuration of the nozzle open/close unit 10. FIG. 15 shows an orientation for attaching the nozzle open/close unit 10.

As shown in FIG. 12, the force feedback apparatus in the present embodiment has a configuration in which the nozzle open/close unit 10 is connected to the force feedback apparatus shown in FIG. 1.

The nozzle open/close unit 10 opens or closes each nozzle 602 in synchronization with air jetting. That is, the nozzle open/close unit 10 opens a nozzle 602 from which air is jetting, and closes a nozzle 602 from which air is not jetting. Therefore, the virtual environment image can be projected on the surface of the nozzle open/close unit 10 when air is not jetting. Or, when viewing the surface of the nozzle open/close unit 10 through the head mounted display, it becomes possible to make the nozzle 602 inconspicuous (not able to be sensed).

The flowchart shown in FIG. 13 is different from the flowchart shown in FIG. 3 in that the nozzle open/close unit 10 opens or closes the nozzle according to air jetting in step 39. There are the following methods as concrete methods for opening/closing the nozzle open/close unit 10.

That is, by using the force of an air jet, the force pushes up the nozzle open/close unit 10 when air is jetting so as to open the nozzle; when the jetting ends, the nozzle open/close unit 10 returns so as to close the nozzle 602.

It is desirable that the nozzle open/close unit 10 be composed of light and thin material; that is, material is used that is flat when any force is not applied and that is easily warped when the force is applied. As shown in FIG. 14, the nozzle open/close unit 10 is fixed at a position near the nozzle 602 using one side of the nozzle open/close unit 10 as a point of support such that it covers the nozzle 602. Accordingly, when air jets from the nozzle 602, another side is moved up by the jetting air while the one side of the nozzle open/close unit 10 remains at the position near the nozzle 602.

It is desirable that the nozzle open/close unit 10 be composed of material that is soft so as to be pushed up by a force of jetted air and that has elasticity so as to return to an original flat shape when the air jetting ends. More particularly, film material that is used as a sticky note can be used. In addition, the color may be one having whiteness that can hide the color of the nozzle 602. That is, the color is one that is not conspicuous when an image is projected on the nozzle open/close unit 10.

In a case when directions in which the nozzle 602 is viewed from the operator 9 concentrate to some extent, the nozzle open/close unit 10 is attached such that the side (fixed side) that is the point of support of opening/closing becomes on the operator's side as shown in FIG. 15. Accordingly, even when the nozzle open/close unit 10 opens, the nozzle 602 can hardly be seen from the side of the operator 9.

In each embodiment, although the force feedback apparatuses shown in FIG. 1 or FIG. 2 are explained as examples, it is possible to adopt a configuration in which the force feedback apparatus does not include the virtual object calculation unit 3, the virtual environment display unit 4, the sound generation control unit 7 and the sound generation unit 8. In this case, for example, it is possible to generate and display the virtual environment using an apparatus outside of the force feedback apparatus. In addition, each configuration described in each embodiment can be applied to other embodiments. For example, the nozzle open/close unit 10 can be applied to the first and second embodiments.

The present invention is not limited to the specifically disclosed embodiments, and variations and modifications may be made without departing from the scope of the invention.

The invention claimed is:

1. A force feedback apparatus comprising:
   a jetting unit that includes nozzles and that is configured to control a jet amount or a jet direction of gas or liquid jetted from the nozzles; and
   a jet control unit configured to control the jet amount or the jet direction of the gas or the liquid according to a position or an orientation of a receiver that has a hemispheric shape and that is configured to receive a pressure by the gas or the liquid jetted from the jetting unit so as to provide force feedback to an operator, wherein
   the position or the orientation of the receiver is measured by a receiver measurement unit,
   the nozzles are arranged in equilateral triangles in the jetting unit, and when the receiver has a concave shape of a diameter D, intervals for placing each of the nozzles in the jetting unit are set such that at least one nozzle exists within a region having a diameter of 0.8×D to exert an even pressure on the receiver at nozzle transitions,
   the receiver is separated from a surface on which the nozzles that form the equilateral triangles are arranged, and
   the gas or the liquid is jetted towards the receiver from the nozzles that form the equilateral triangles.

2. The force feedback apparatus as claimed in claim 1, wherein the jetting unit includes a nozzle open/close unit for opening or closing a nozzle of the nozzles in response to an occurrence of a jet of the gas or the liquid, and wherein a point of support for opening and closing of the nozzle with the open/close unit is provided on an operator side of the nozzle.

3. The force feedback apparatus as claimed in claim 1, further comprising a virtual object calculation unit configured to calculate a state of a virtual object in a virtual environment, to be displayed by a virtual environment display unit, according to the position or the orientation of the receiver.

4. The force feedback apparatus as claimed in claim 3, further comprising a sound generation control unit configured to control an attribute of a sound generated by a sound generation unit according to the state of the virtual object, or the position or the orientation of the receiver.

5. The force feedback apparatus as claimed in claim 4, wherein the sound generation control unit is configured to control the attribute of the sound generated by the sound generation unit according to the state of the virtual object, or the position or the orientation of the receiver, and according to identification of the receiver or a shape or a color of the receiver measured by the receiver measurement unit.

6. A force feedback method, comprising:
   controlling a jet amount or a jet direction of gas or liquid from nozzles included in a jetting unit according to a position or an orientation of a receiver that has a hemispheric shape and that is configured to receive a pressure from the gas or the liquid jetted from the nozzles so as to provide force feedback to an operator, the nozzles being arranged in equilateral triangles in the jetting unit, wherein,
   when the receiver has a concave shape of a diameter D, intervals for placing the nozzles in the jetting unit are set such that at least one nozzle exists within a region having a diameter of 0.8×D to exert an even pressure on the receiver at nozzle transitions,
   the receiver is separated from a surface on which the nozzles that form the equilateral triangles are arranged, and
   the gas or the liquid is jetted towards the receiver from the nozzles that form the equilateral triangles.

7. The force feedback method as claimed in claim 6, further comprising:
    calculating a state of a virtual object in a virtual environment, to be displayed by a virtual environment display unit, according to the position or the orientation of the receiver.

8. The force feedback method as claimed in claim 7, further comprising:
    controlling an attribute of a sound generated by a sound generation unit according to the state of the virtual object or the position or the orientation of the receiver.

9. The force feedback method as claimed in claim 8, the controlling an attribute of a sound including controlling an attribute of a sound generated by the sound generation unit according to the state of the virtual object or the position or the orientation of the receiver, and according to identification of the receiver or a shape or a color of the receiver.

* * * * *